United States Patent
Goto et al.

(10) Patent No.: US 11,421,170 B2
(45) Date of Patent: Aug. 23, 2022

(54) MINERAL BASE OIL, MOLDED ARTICLE, AND METHOD FOR PRODUCING MINERAL BASE OIL

(71) Applicant: IDEMITSU KOSAN CO., LTD., Chiyoda-ku (JP)

(72) Inventors: Kenji Goto, Chiba (JP); Hitoshi Rokkaku, Tomakoma (JP); Yuta Yamamoto, Chiba (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 0 days.

(21) Appl. No.: 16/632,706

(22) PCT Filed: Nov. 12, 2018

(86) PCT No.: PCT/JP2018/041881
§ 371 (c)(1),
(2) Date: Jan. 21, 2020

(87) PCT Pub. No.: WO2019/093519
PCT Pub. Date: May 16, 2019

(65) Prior Publication Data
US 2021/0130724 A1     May 6, 2021

(30) Foreign Application Priority Data
Nov. 10, 2017 (JP) .............. JP2017-217666

(51) Int. Cl.
| | |
|---|---|
| *C10M 101/02* | (2006.01) |
| *C08L 21/00* | (2006.01) |
| *C08L 91/00* | (2006.01) |
| *C08L 101/00* | (2006.01) |
| *C10G 53/04* | (2006.01) |
| *C10N 20/00* | (2006.01) |
| *C10N 30/00* | (2006.01) |
| *C10N 30/02* | (2006.01) |

(52) U.S. Cl.
CPC .......... *C10M 101/02* (2013.01); *C08L 21/00* (2013.01); *C08L 91/00* (2013.01); *C08L 101/00* (2013.01); *C10G 53/04* (2013.01); C10G 2300/304 (2013.01); C10G 2400/10 (2013.01); C10N 2020/01 (2020.05); C10N 2030/02 (2013.01); C10N 2030/43 (2020.05)

(58) Field of Classification Search
CPC ........ C08L 91/00; C08L 21/00; C08L 101/00; C10G 53/04; C10G 2400/10; C10G 2300/304; C10N 2020/01; C10N 2030/02; C10N 2030/43; C10N 2020/02; C10M 101/02; C10M 171/00; C10M 2203/1025
See application file for complete search history.

(56) References Cited

U.S. PATENT DOCUMENTS

| | | | |
|---|---|---|---|
| 4,199,433 | A | 4/1980 | Button et al. |
| 5,006,222 | A | 4/1991 | Sequeira, Jr. |
| 5,504,135 | A | 4/1996 | Ardrizzi et al. |
| 2005/0272850 | A1* | 12/2005 | Jois .................. C08K 5/01 |
| | | | 524/484 |
| 2006/0254955 | A1 | 11/2006 | Kaimai et al. |

FOREIGN PATENT DOCUMENTS

| | | |
|---|---|---|
| CN | 1976985 A | 6/2007 |
| CN | 104245896 A | 12/2014 |
| JP | 55-123667 A | 9/1980 |
| JP | 3-223394 | 10/1991 |
| JP | 6-505524 A | 6/1994 |
| JP | 7-207282 | 8/1995 |
| JP | 2004-182931 A | 7/2004 |
| JP | 2009-13421 A | 1/2009 |
| JP | 5955607 B2 | 7/2016 |
| WO | WO 03/031537 | 4/2003 |

OTHER PUBLICATIONS

International Search Report dated Jan. 29, 2019 in PCT/JP2018/041881 filed on Nov. 12, 2018, 2 pages.
Office Action dated Apr. 5, 2022, in Japanese Patent Application No. 2019-552423 (with English-language Translation).
Office Action in CN Application No. 201880049569.3. dated Mar. 17, 2022.

* cited by examiner

*Primary Examiner* — Vishal V Vasisth
(74) *Attorney, Agent, or Firm* — Oblon, McClelland, Maier & Neustadt, L.L.P.

(57) ABSTRACT

Provided are a mineral base oil satisfying the following requirements (I) to (IV), which is excellent in safety and environmental aspects and has good compatibility with resin; a molded article formed of a resin composition containing the mineral base oil and a resin; and a method for producing the mineral base oil. Requirement (I): The flash point is 200° C. or higher. Requirement (II): The pour point is 0° C. or lower. Requirement (III): The aromatic content (% $C_A$) is 2.6 or more. Requirement (IV): The toluene content, as measured according to JIS A1965:2015, is more than 0 μg/m³ and less than 500 μg/m³.

9 Claims, No Drawings

MINERAL BASE OIL, MOLDED ARTICLE, AND METHOD FOR PRODUCING MINERAL BASE OIL

This application is a 371 of PCT/JP2018/041881 filed Nov. 12, 2018.

TECHNICAL FIELD

The present invention relates to a mineral base oil, and a molded article formed of a resin composition containing the mineral base oil and a resin, and a method for producing the mineral base oil.

BACKGROUND ART

A resin composition containing a resin such as a rubber resin or a thermoplastic elastomer is worked into a molded article through extrusion molding, injection molding, blow molding or calendering in accordance with the use and the necessary characteristics of final products.

On that occasion, a mineral base oil may be blended in the resin composition for the purpose of improving workability.

The mineral base oil plays a role of so-called plasticizer and has a function to improve the workability of the resin composition.

Regarding a mineral base oil to be blended in such a resin composition, for example, PTL 1 describes a resin-processing process oil for use in production of a porous film, which is so prepared as to have a 40° C. kinematic viscosity of 25 to 430 mm$^2$/s, an aromatic content (% $C_A$) of 0.5 or less, and a sulfur content of 30 ppm by mass or less.

CITATION LIST

Patent Literature

PTL 1: Japanese Patent 5955607

SUMMARY OF INVENTION

Technical Problem

In general and in many cases, a mineral base oil for use for a lubricating oil is required to have a low aromatic content (% $C_A$), but a mineral base oil for use for a resin-processing process oil is desired to have a high aromatic content (% $C_A$) for the purpose of improving compatibility with resin.

Consequently, as a mineral base oil for use for a resin-processing process oil, a mineral base oil having a high aromatic content (% $C_A$) is desired.

In production of an ordinary mineral base oil, in general, a distillate obtained through atmospheric distillation and vacuum distillation of a crude oil is refined through hydroreforming or the like and the resultant refined oil is further subjected to dewaxing treatment for precipitating and removing wax component therefrom.

Such dewaxing treatment includes solvent dewaxing treatment and hydroisomerization dewaxing treatment, and in the case of hydroisomerization dewaxing treatment, the aromatic content in the feedstock oil is decomposed or hydrogenated through the treatment to cause a problem that the aromatic content (% $C_A$) in the resultant dewaxed oil lowers.

As opposed to this, in the case of solvent dewaxing treatment, a wax content can be effectively removed while the aromatic content in the feedstock oil can be kept as such, which is therefore advantageous. However, solvent dewaxing treatment is a method where a solvent containing toluene is added to a refined oil after refining treatment and cooled to precipitate and remove the wax component from the refined oil through filtration, in which the solvent used is separated and removed, but toluene not removed may remain to a small extent in the resultant solvent-dewaxed oil.

Recently, a volatile organic compound (VOC) such as toluene has been subjected to emission controls in point of safety and environmental aspects, and a base oil having a reduced content of VOC is desired. Consequently, the residual toluene as mentioned above is also required to be reduced.

Accordingly, in general, a solvent-dewaxed oil is generally hydrofinished for the purpose of removing residual toluene and removing impurities such as sulfur. According to such hydrofinishing treatment, impurities and residual toluene contained in a solvent-dewaxed oil can be effectively reduced.

However, depending on hydrofinishing conditions, an aromatic component contained in a solvent-dewaxed oil may also be decomposed or hydrogenated, resulting in that the aromatic content (% $C_A$) in the resultant hydrofinished oil (mineral oil product) tends to be reduced.

To that effect, heretofore, in production of a mineral base oil, it is difficult to reduce the toluene content therein while keeping the aromatic content (% $C_A$) high in the resultant mineral base oil. However, as described above, for a mineral base oil for use for a resin-processing process oil, a mineral base oil having a high aromatic content (% $C_A$) is desired, and therefore, recently, it has become desired to develop a mineral base oil having a low toluene content and having a high aromatic content (% $C_A$), taking VOC emission controls into consideration. In this connection, no specific investigation from such an aspect is made in PTL 1.

An object of the present invention is to provide a mineral base oil excellent in safety and environmental aspects and having good compatibility with resin, a molded article formed by molding a resin composition containing such a mineral base oil and a resin, and a method for producing the mineral base oil.

Solution to Problem

The present inventors have found that a mineral base oil prepared to have a flash point, a pour point, an aromatic content (% $C_A$) and a toluene content each falling within a predetermined range can solve the above-mentioned problems, and have completed the present invention.

Specifically, the present invention provides the following [1] to [3].

[1] A mineral base oil satisfying the following requirements (I) to (IV):
Requirement (I): The flash point is 200° C. or higher,
Requirement (II): The pour point is 0° C. or lower,
Requirement (III): The aromatic content (% $C_A$) is 2.6 or more, and
Requirement (IV): The toluene content, as measured according to JIS A1965:2015, is more than 0 μg/m$^3$ and less than 500 μg/m$^3$.

[2] A molded article formed of a resin composition containing a mineral base oil of the above [1] and one or more resins selected from a rubber resin and a thermoplastic elastomer.

[3] A method for producing a mineral base oil of the above [1], including:
a solvent-dewaxing step (α) using a solvent containing toluene.

Advantageous Effects of Invention

The mineral base oil of the present invention is excellent in safety and environmental aspects and has good compatibility with resin, and is therefore favorable as a resin-processing process oil.

DESCRIPTION OF EMBODIMENTS

[Mineral Base Oil]

The mineral base oil of the present invention is so prepared as to satisfy the following requirements (I) to (IV).

Requirement (I): The flash point is 200° C. or higher.
Requirement (II): The pour point is 0° C. or lower.
Requirement (III): The aromatic content (% $C_A$) is 2.6 or more.
Requirement (IV): The toluene content, as measured according to JIS A1965:2015, is more than 0 μg/m³ and less than 500 μg/m³.

A mineral base oil satisfying the requirement (I) can secure safety even in heating in mixing with a resin.

From the above-mentioned viewpoint, the flash point of the mineral base oil of one embodiment of the present invention is preferably 210° C. or higher, more preferably 230° C. or higher, even more preferably 250° C. or higher, further more preferably 280° C. or higher, and is generally 450° C. or lower.

In this description, the flash point means a value measured by a Cleveland open-cup method (COC method) according to JIS K2265-4:2007.

A mineral base oil satisfying the requirement (II) can be prevented from solidifying in shipping and delivery with a tanker or the like in low-temperature environments (for example, in an environment at −20 to 0° C.) to therefore improve the handleability thereof.

From the above-mentioned viewpoint, the pour point of the mineral base oil of one embodiment of the present invention is preferably −2.5° C. or lower, more preferably −5.0° C. or lower, even more preferably −7.5° C. or lower, further more preferably −10.0° C. or lower. The lower limit thereof is not specifically limited but is, for example, −60° C. or higher.

In this description, the pour point means a value measured by the method described in JIS K2269-1987.

A mineral base oil satisfying the requirement (III) and therefore having a high aromatic content (% $C_A$) can have improved compatibility with resin. Consequently, in particular, the mineral base oil can be suitable as a resin-processing process oil.

From the above-mentioned viewpoint, the aromatic content (% $C_A$) in the mineral base oil of one embodiment of the present invention is preferably 2.8 or more, more preferably 3.0 or more, even more preferably 3.3 or more, further more preferably 3.5 or more, and is preferably 15.0 or less, more preferably 12.0 or less, even more preferably 10.0 or less.

The naphthene content (% $C_N$) in the mineral base oil of one embodiment of the present invention is preferably 5 to 40, more preferably 10 to 38, even more preferably 15 to 35, further more preferably 20 to 32.

The paraffin content (% $C_P$) in the mineral base oil of one embodiment of the present invention is preferably 50 to 80, more preferably 55 to 77, even more preferably 60 to 75, further more preferably 65 to 72.

In this specification, the aromatic content (% $C_A$), the naphthene content (% $C_N$) and the paraffin content (% $C_P$) in the mineral base oil each mean the proportion (percentage) of carbon in the aromatic component, the naphthene component and the paraffin component, respectively, as measured using the ASTM D-3238 1995 ring analysis (n-d-M method).

In general, for providing a mineral base oil satisfying the above-mentioned requirements (I) and (II), in many cases, a feedstock oil (for example, a hydroreformed oil) is dewaxed with solvent to remove a wax component from the feedstock oil to give a solvent-dewaxed oil.

In such solvent-dewaxing treatment, from the viewpoint of facilitating wax precipitation, in general, a solvent containing toluene is used.

The mineral base oil of the present invention is also one prepared by solvent-dewaxing a feedstock oil using a solvent containing toluene. Therefore, in the mineral base oil of the present invention, as defined by the requirement (IV), toluene is detected in measurement according to JIS A1965:2015. Namely, the mineral base oil of the present invention has a toluene content, as measured according to JIS A1965:2015, of more than 0 μg/m³.

On the other hand, toluene is a kind of a volatile organic compound (VOC), and from the viewpoint of safety and environmental aspects, a toluene content in a mineral base oil is desired to be reduced.

In consideration of this point, the mineral base oil of the present invention is, as defined by the requirement (IV), so prepared as to have a toluene content, as measured according to JIS A1965:2015, of less than 500 μg/m³.

From the above-mentioned viewpoint, in the mineral base oil of one embodiment of the present invention, the toluene content to be measured according to JIS A1965:2015 is, per m³ of the vapor phase in measurement according to JIS A1965:2015, preferably less than 430 μg/m³, more preferably less than 330 μg/m³, even more preferably less than 300 μg/m³, further more preferably less than 270 μg/m³, further more preferably less than 240 μg/m³, further more preferably less than 180 μg/m³.

In addition, as described above, the mineral base oil of one embodiment of the present invention is prepared through solvent-dewaxing treatment of a feedstock oil using a solvent containing toluene, and therefore in this, toluene is detected in the above-mentioned measurement according to JIS A1965:2015, and the toluene content therein is more than 0 μg/m³. A substantial lower limit thereof is a detection limit in the above-mentioned measurement. From the viewpoint of practicability and productivity, the toluene content may be 3.0 μg/m³ or more.

In addition, the mineral base oil of one embodiment of the present invention preferably further satisfies the following requirement (V).

Requirement (V): The sulfur atom content is, based on the total amount (100% by mass) of the mineral base oil, less than 500 ppm by mass.

A mineral base oil having a sulfur atom content of less than 500 ppm by mass, as defined by the requirement (V), can more effectively express the function of additives that may be further added to the mineral base oil. For example, when an antioxidant is added thereto, the mineral base oil can more readily express an effect of preventing oxidation.

From the above-mentioned viewpoint, in the mineral base oil of one embodiment of the present invention, the sulfur atom content is, based on the total amount (100% by mass)

of the mineral base oil, preferably less than 400 ppm by mass, more preferably less than 300 ppm by mass, even more preferably less than 250 ppm by mass, further more preferably less than 150 ppm by mass.

In this description, the sulfur atom content means a value measured according to JIS K2541-6:2003.

The aniline point of the mineral base oil of one embodiment of the present invention is, from the viewpoint of bettering compatibility with resin, preferably 85 to 160° C., more preferably 90 to 150° C., even more preferably 95 to 145° C., further more preferably 100 to 140° C.

In this description, the aniline point means a value measured according to JIS K2256:2013 (U-shaped tube method).

The kinematic viscosity at 40° C. of the mineral base oil of the present invention is preferably 20 to 550 mm$^2$/s, more preferably 25 to 500 mm$^2$/s, even more preferably 30 to 450 mm$^2$/s.

The kinematic viscosity at 100° C. of the mineral base oil of the present invention is preferably 3.0 to 40.0 mm$^2$/s, more preferably 3.5 to 37.0 mm$^2$/s, even more preferably 4.0 to 35.0 mm$^2$/s.

The viscosity index of the mineral base oil of the present invention is preferably 80 or more, more preferably 85 or more, even more preferably 90 or more, further more preferably 95 or more.

In this description, the kinematic viscosity and the viscosity index each mean a value measured or calculated according to JIS K2283:2000.

[Production Method for Mineral Base Oil]

Next, a preferred embodiment of a production method for the mineral base oil of the present invention is described.

The production method for a mineral base oil of this embodiment is so prepared as to produce a mineral base oil satisfying the requirements (I) to (IV), and includes at least the following step ($\alpha$) and preferably includes the following step ($\beta$) after the step ($\alpha$).

Step ($\alpha$): A step of solvent-dewaxing a feedstock oil with a solvent containing toluene to give a solvent-dewaxed oil.

Step ($\beta$): A step of subjecting the solvent-dewaxed oil obtained in the step ($\alpha$) to a finishing treatment including at least a steam treatment.

According to the production method for a mineral base oil of this embodiment, a mineral base oil satisfying the requirements (I) to (IV) can be produced efficiently. In particular, in the production method for a mineral base oil of this embodiment, it is important to appropriately select a finishing treatment in accordance with the aromatic content (% $C_A$) in the solvent-dewaxed oil after solvent-dewaxing treatment, and accordingly, a mineral base oil satisfying the requirements (III) and (IV) can be produced efficiently.

The constituent steps are described in detail hereinunder.

<Step ($\alpha$)>

First, in the step ($\alpha$), a feedstock oil is solvent-dewaxed using a solvent containing toluene to give a solvent-dewaxed oil.

After the step, a mineral base oil satisfying the requirement (II) can be prepared.

(Feedstock Oil)

Examples of the feedstock oil to be subjected to the solvent-dewaxing treatment are, though not specifically limited thereto, (1) one or a mixed oil of two or more selected from a topped crude obtained through atmospheric distillation of a crude oil; a vacuum distillate and a vacuum residue obtained through vacuum distillation of the topped crude; and a deasphalted oil obtained through deasphalting treatment of the vacuum residue (hereinafter this may be referred to as a feedstock oil (1)), and (2) a refined oil produced by subjecting the feedstock oil (1) to at least one refining treatment of hydroreforming (hydrocracking) treatment and solvent extraction treatment (hereinafter this may be referred to as a feedstock oil (2)). One alone or two or more kinds of these feedstock oils may be used either singly or as combined.

[Feedstock Oil (1)]

The feedstock oil (1) includes one or more selected from a topped crude, a vacuum distillate, a vacuum residue and a deasphalted oil. Treatment for producing the feedstock oil (1) is described briefly.

Atmospheric Distillation

Atmospheric distillation is a treatment for taking out a fuel oil fraction such as kerosene and gas oil from a crude oil such as a paraffinic crude oil or an intermediate crude oil, and collecting the topped crude remaining at the bottom of a distillation column.

Vacuum Distillation

Vacuum distillation is a treatment for taking out a desired viscosity fraction from the topped crude and collecting the vacuum residue remaining at the bottom of a distillation column.

Deasphalting Treatment

Deasphalting treatment is a treatment for separating asphalt from the vacuum residue to give a deasphalted oil.

Deasphalting treatment is generally solvent-deasphalting treatment. Examples of the solvent to be used in solvent-deasphalting treatment include a linear saturated hydrocarbon having 3 to 6 carbon atoms, specifically, propane, n-butane, isobutane, n-pentane, isopentane, and n-hexane. Propane is preferably contained. One alone or two or more kinds of such solvents may be used either singly or as combined.

Preferably, from the viewpoint of preparing a mineral base oil satisfying the requirement (III), the feedstock oil (1) contains at least one of a vacuum distillate, a vacuum residue and a deasphalted oil, and more preferably contains at least one of a vacuum distillation oil and a deasphalted oil.

In particular, from the viewpoint of preparing a mineral base oil having a desired kinematic viscosity, the feedstock oil (1) is more preferably a mixed oil of a deasphalted oil and a vacuum distillate.

In the mixed oil, the content ratio of the deasphalted oil to the vacuum distillate (above-mentioned deasphalted oil above-mentioned vacuum distillate) may be appropriately defined depending on the desired kinematic viscosity of the mineral base oil to be obtained, but is, as a ratio by volume, preferably 10/90 to 90/10, more preferably 20/80 to 80/20, even more preferably 30/70 to 70/30.

In the case where the feedstock oil (1) is used as a feedstock oil to be subjected to solvent-dewaxing treatment, if desired, the feedstock oil (1) may be further subjected to degasification treatment or stripping treatment.

[Feedstock Oil (2)]

The feedstock oil (2) is one prepared by subjecting the above-mentioned feedstock oil (1) to at least one refining treatment of hydroreforming treatment and solvent extraction treatment. Using the feedstock oil (2) as a feedstock oil, a mineral base oil satisfying the requirement (I) can be readily prepared. Refining treatment for preparing the feedstock oil (2) is described in detail hereinunder.

Hydroreforming Treatment

Hydroreforming treatment is a refining treatment for removing impurities such as sulfur components and nitrogen components contained in the feedstock oil (1) and for hydrogenation of unstable substances such as olefins therein.

Hydroreforming treatment is carried out in the presence of a hydrogenation catalyst.

Examples of the hydrogenation catalyst include a catalyst that carries a metal oxide of a composite metal material such as nickel (Ni) and tungsten (W), nickel (Ni) and molybdenum (Mo), or cobalt (Co) and molybdenum (Mo), or a noble metal such as platinum (Pt) and lead (Pb) on an amorphous carrier such as composite material of a silica and alumina or alumina, or on a crystalline carrier such as zeolite.

The hydroreforming treatment is carried out while the conditions for the treatment are appropriately controlled so as to produce a mineral base oil satisfying the requirements (I), (III) and (V).

Specifically, the hydrogen partial pressure in the hydrogenation reforming treatment is preferably 15 to 25 MPa, more preferably 16 to 24 MPa, even more preferably 18 to 23 MPa.

From the above-mentioned viewpoint, the reaction temperature in the hydroreforming treatment is preferably 250 to 500° C., more preferably 300 to 450° C., even more preferably 320 to 400° C.

The liquid hourly space velocity (LHSV) in the hydroreforming treatment is, from the viewpoint of providing a mineral base oil satisfying the requirements (I), (III) and (V), preferably 5.0 $hr^{-1}$ or less, more preferably 2.0 $hr^{-1}$ or less, even more preferably 1.5 $hr^{-1}$ or less, and is, from the viewpoint of productivity, preferably 0.1 $hr^{-1}$ or more, more preferably 0.2 $hr^{-1}$ or more, even more preferably 0.3 $hr^{-1}$ or more.

The supply ratio of hydrogen gas in the hydroreforming treatment is preferably 100 to 2000 $Nm^3$, relative to 1 kiloliter of supply oil, more preferably 200 to 1500 $Nm^3$, even more preferably 250 to 1100 $Nm^3$.

For producing a mineral base oil having a desired kinematic viscosity, the refined oil after hydroreforming treatment (hydrorefined oil) may be again subjected to vacuum distillation to be fractionated into fractions with respect to a desired viscosity fraction.

Hydroreforming treatment requires treatment conditions that are severer than those for hydrofinishing treatment to be mentioned below, and therefore the aromatic content (% $C_A$) in the feedstock oil (1) readily lowers after the treatment. Consequently, in the case of carrying out hydroreforming treatment, the feedstock oil (1) to be subjected is preferably one having a relatively high aromatic content (% $C_A$).

Another advantage of hydrorefined oil is that, as compared with that in solvent extraction treatment to be mentioned hereinunder, the yield of the oil through refining treatment is relatively high.

Solvent Extraction Treatment

Solvent extraction treatment is a refining treatment to be carried out for the purpose of safety improvement by polycyclic aromatic (PCA) removal and for the purpose of viscosity index improvement by control and optimization of the amount of aromatic components.

Solvent extraction treatment is carried out by appropriately controlling the conditions so as to provide a mineral base oil satisfying the requirement (II).

The aromatic content (% CA) in the solvent-extracted oil obtained through solvent extraction treatment is preferably 2.6 or more, more preferably 3.5 or more, even more preferably 5.0 or more.

The viscosity index of the solvent-extracted oil obtained through solvent extraction treatment is preferably 80 or more, more preferably 85 or more, even more preferably 95.

In the solvent extraction treatment, a reduction in the aromatic content (% $C_A$) from the feedstock oil (1) through the refining treatment is small as compared with that in hydroreforming treatment. Consequently, in the case of solvent extraction treatment, the feedstock oil (1) can be selected in a broad range and in particular, the refining treatment is suitable for a feedstock oil (1) having a small aromatic content (% $C_A$).

On the other hand, solvent extraction treatment is inferior to hydroreforming treatment in point of impurity removal. Consequently, in particular, from the viewpoint of preparing a mineral base oil satisfying the requirement (V), hydroreforming treatment is more preferably carried out.

The aromatic content (% $C_A$) in the feedstock oil (2) can be controlled by combining the feedstock oil (1) to be used and the refining treatment to be selected. For example, using the same feedstock oil (1), when a hydrorefined oil of the feedstock oil (2) obtained by hydroreforming the feedstock oil (1) is compared with a solvent-extracted oil of the feedstock oil (2) obtained by solvent-extracting the feedstock oil (1), the aromatic content (% $C_A$) is lower in the hydrorefined oil.

Also in the case where the feedstock oil (2) is used as a feedstock oil to be solvent-dewaxed, if desired, the feedstock oil (2) may be further subjected to degasification treatment or stripping treatment.

(Solvent Dewaxing Treatment)

Solvent dewaxing treatment is carried out for the purpose of wax removal from a feedstock oil. Through the treatment, a mineral base oil satisfying the requirements (I) and (II) can be readily produced.

In general, in solvent dewaxing treatment, wax removal is combined with removal of toluene used as the solvent. However, toluene not completely removed through solvent dewaxing treatment may remain in the solvent-dewaxed oil and causes some problems in point of safety and environmental aspects. Therefore, in general, the solvent-dewaxed oil is further subjected to finishing treatment for removing the residual toluene.

In the production method for a mineral base oil of this embodiment, the contents of the finishing treatment are appropriately selected depending on the amount of the aromatic content (% $C_A$) in the solvent-dewaxed oil in the step (β) to be mentioned hereinunder, and accordingly a mineral base oil satisfying the requirements (III) and (IV) can be efficiently produced.

Solvent dewaxing treatment is carried out by appropriately controlling the condition so as to provide a mineral base oil satisfying the requirements (II) and (IV).

Specifically, the solvent to be used in solvent dewaxing treatment contains at least toluene, but may contain any other solvent.

Examples of the other solvents include aliphatic ketones having 3 to 6 carbon atoms such as methyl ethyl ketone, and methyl isobutyl ketone, and aliphatic hydrocarbons having 3 to 6 carbon atoms such as propane and butane.

Among these, the solvent for use in this step is preferably a mixed solvent of toluene and an aliphatic ketone, and more preferably a mixed solvent of toluene and methyl ethyl ketone.

The toluene content in the solvent for use in solvent dewaxing treatment is, relative to the total amount (100% by mass) of the solvent, preferably 20 to 100% by mass, more preferably 30 to 90% by mass, even more preferably 35 to 75% by mass, further more preferably 40 to 60% by mass.

The cooling temperature in solvent dewaxing treatment is preferably −40 to 0° C., more preferably −30 to −5° C., even more preferably −25 to −10° C. Falling within the range, a solvent-dewaxed oil having a predetermined pour point can be produced. Wax precipitated by cooling is separated from the liquid components (solvent and processed oil) through filtration.

As a method for separating and removing solvent from processed oil in solvent dewaxing treatment, refining by distillation is generally employed. Through such solvent separation treatment, most solvents can be removed. However, toluene that could not be removed may remain in the solvent-dewaxed oil.

The aromatic content (% $C_A$) contained in the resultant solvent-dewaxed oil mostly depends on the aromatic content in the feedstock oil to be subjected to solvent dewaxing treatment. Consequently, in the case where a feedstock oil having a large aromatic content is used, a solvent-dewaxed oil having a large aromatic content is obtained.

As described above, the feedstock oil to be solvent-dewaxed is, though not specifically limited thereto, preferably the feedstock oil (2). Accordingly, the production method for a mineral base oil of this embodiment preferably includes the following step (0) prior to the step (α), in which, more preferably, the step (0), the step (α) and the step (β) are carried out in that order.

Step (0): A step of subjecting a feedstock oil to at least one refining treatment of hydroreforming treatment and solvent extraction treatment to give a refined oil.
<Step (0)>

The step (0) is a step of subjecting a feedstock oil to at least one refining treatment and hydroreforming treatment and solvent extraction treatment to give a refined oil.

Via the step (0), a mineral base oil satisfying the requirement (I) can be readily prepared.

The feedstock oil in this step corresponds to the above-mentioned feedstock oil (1) and is a feedstock oil before subjected to refining, and the refined oil obtained through refining of the feedstock oil corresponds to the above-mentioned feedstock oil (2).
<Step (β)>

Next, in the step (β), the solvent-dewaxed oil obtained in the step (α) is subjected to finishing treatment including at least steam treatment.

Via the step, a mineral base oil satisfying the requirements (III) and (IV) can be prepared.
(Finishing Treatment)

Finishing treatment includes at least steam treatment, and in the case where the aromatic content (% $C_A$) in the solvent-dewaxed oil is sufficiently high, the treatment may be further combined with hydrofinishing. Through such hydrofinishing, residual toluene can be fully removed while preventing decomposition of the aromatic components contained in the solvent-dewaxed oil, and a mineral base oil satisfying the requirements (III) and (IV) can be readily obtained. Steam treatment and hydrofinishing treatment as a finishing treatment are described in detail hereinunder.
Steam Treatment Steam treatment is preferred especially from the viewpoint that residual toluene can be efficiently removed while keeping the aromatic content in the solvent-dewaxed oil as such. In particular, steam treatment alone is carried out as finishing treatment from the viewpoint that a mineral base oil satisfying the requirement (III) is readily produced.

In steam treatment, by appropriately controlling the degasification tank inlet temperature (COT), the steam flow rate (STM) and the feed flow rate (FEED), a mineral base oil satisfying the requirements (III) and (IV) can be prepared.

Regarding specific controlling methods, these are preferably so controlled as to satisfy the following requirements (i) to (iii) where the degasification tank inlet temperature (COT) is represented by X (° C.), and a ratio of the steam flow rate (STM) to the feed flow rate (FEED) [STM (t/h)/FEED (t/h)] is represented by Y.

Requirement (i): X≥200
Requirement (ii): Y≥0.0300
Requirement (iii): 240−640×Y<X As defined by the requirement (i), by adjusting the degasification tank inlet temperature (COT) represented by X to 200° C. or higher, a mineral base oil having a more reduced toluene content can be prepared.

X defined in the requirement (i) is, from the above-mentioned viewpoint, 200 or more, but is preferably 205 or more, more preferably 210 or more, even more preferably 215 or more, further more preferably 225 or more, and is generally 250 or less.

As defined by the requirement (ii), the ratio of the steam flow rate (STM) to the feed flow rate (FEED) [STM/FEED] represented by Y is 0.0300 or more, and under the condition, it is considered that a steam amount can be sufficiently secured relative to the supply oil and a toluene content reducing effect can be thereby more readily expressed.

Y defined by the requirement (ii) is 0.0300 or more, but is, from the above-mentioned viewpoint, preferably 0.0400 or more, more preferably 0.0500 or more, even more preferably 0.0600 or more, further more preferably 0.0700 or more, and is generally 0.1000 or less.

Further, from plural data, the present inventors have found that, when the inequality expression defined by the requirement (iii) is satisfied, a toluene content reducing effect can be more readily expressed.

The inequality expression is a definition derived from various data of a toluene content in a mineral base oil in a steam treatment where the degasification tank inlet temperature (COT) and the ratio [STM/FEED] were appropriately varied.

From the viewpoint of obtaining a mineral base oil satisfying the requirements (III) and (IV), preferably, the following requirement (iv) is satisfied along with the requirements (i) to (iii) in this step.

Requirement (iv): P that satisfies P=(240−X)/Y is 640 or less.

X and Y in the expression defined by the requirement (iv) are the same as those in the above-mentioned requirements (i) to (iii).

From the above-mentioned viewpoint, the value P is preferably 600 or less, more preferably 580 or less, even more preferably 565 or less, further more preferably 500 or less, and is generally 100 or more.
Hydrofinishing Treatment Hydrofinishing treatment is a treatment similar to the above-mentioned hydroreforming treatment and is a refining treatment to be carried out for the purpose of removing impurities contained in the solvent-dewaxed oil to be subjected and for hydrogenation of unstable substances such as olefins therein.

Here, a difference from hydroreforming treatment is that hydrofinishing treatment is carried out under relatively mild conditions. Consequently, in this treatment, the aromatic content (% $C_A$) in the resultant finished oil (mineral base oil) can be kept high in some degree without significantly lowering the aromatic content (% $C_A$) contained in the solvent-dewaxed oil to be subjected.

However, as compared with the above-mentioned steam treatment, in hydrofinishing treatment the aromatic content (% $C_A$) in the finished oil may readily reduce, and therefore in the case where the aromatic content (% $C_A$) in the solvent-dewaxed oil to be subjected is already close to the lower limit of the requirement (III), preferably, the conditions for the hydrofinishing treatment are set more moderately than ordinary in order that a predetermined aromatic content (% $C_A$) can be kept as such, or as the case may be, more preferably, hydrofinishing treatment itself is omitted.

Hydrofinishing treatment, if any, can be carried out before or after the above-mentioned steam treatment.

Hydrofinishing treatment is carried out in the presence of a hydrogenation catalyst. The hydrogenation catalyst may be the same as the catalyst mentioned above for use in hydroreforming treatment.

The hydrogen partial pressure in hydrofinishing treatment is preferably 2 to 30 MPa, more preferably 2.5 to 27 MPa, even more preferably 3 to 20 MPa.

The reaction temperature in hydrofinishing treatment is preferably 180 to 480° C., more preferably 200 to 450° C., even more preferably 220 to 430° C.

In hydrofinishing treatment, for example, in the case where the hydrogen partial pressure is high, the balance between the hydrogen partial pressure and the reaction temperature is appropriately controlled, for example, in such a manner that the reaction temperature is set relatively low, especially for obtaining a mineral base oil satisfying the requirements (I) and (III).

The liquid hourly space velocity (LHSV) in hydrofinishing treatment is preferably 5.0 $hr^{-1}$ or less, more preferably 2.0 $hr^{-1}$ or less even more preferably 1.5 $hr^{-1}$ or less, and is preferably 0.1 $hr^{-1}$ or more, more preferably 0.2 $hr^{-1}$ or more, even more preferably 0.3 $hr^{-1}$ or more.

The hydrogen gas flow rate in hydrofinishing treatment is preferably 100 to 2000 $Nm^3$ relative to 1 kiloliter of the supply oil, more preferably 200 to 1500 $Nm^3$, even more preferably 250 to 1100 $Nm^3$.

Preferably, the above-mentioned finishing treatments are appropriately combined relative to the relationship to the aromatic content (% $C_A$) in the solvent-dewaxed oil. For example, the following combinations may be employed. In the case where the aromatic content (% $C_A$) in the solvent-dewaxed oil is relatively low;

For example, in a refined oil (feedstock oil (2), hydrorefined oil) obtained by hydroreforming a feedstock oil (1), impurities are sufficiently reduced, but in this, the aromatic content (% $C_A$) tends to also lower. In a solvent-dewaxed oil prepared by solvent-dewaxing such a refined oil as a feedstock oil, the aromatic content (% $C_A$) tends to be relatively small. Consequently, preferably, from the viewpoint of providing a mineral base oil satisfying the requirement (III), such a solvent-dewaxed oil is steam-treated alone. This is because, if a solvent-dewaxed oil having a relatively small aromatic content (% $C_A$) is hydrofinished, a mineral base oil satisfying the requirement (III) is difficult to obtain.

In the case where the aromatic content (% $C_A$) in the solvent-dewaxed oil is relatively high;

For example, a refined oil (feedstock oil (2), solvent-extracted oil) obtained by solvent-extracting a feedstock oil (1) can be refined appropriately while the aromatic content (% $C_A$) in the feedstock oil (1) is kept as such. A solvent-dewaxed oil obtained by solvent-dewaxing such a refined oil as a feedstock oil tends to have a relatively high aromatic content (% $C_A$). Consequently, from the viewpoint of providing a mineral base oil satisfying the requirements (III) and (IV), such a solvent-dewaxed oil can be subjected to a combination of hydrofinishing treatment and steam treatment.

Preferably, from the viewpoint of satisfying the requirements (I) to (V), the production method for a mineral base oil of this embodiment includes the step (0), the step (α) and the step (β) alone. In such a production method, more preferably, hydroreforming treatment is carried out as the refining treatment in the step (0), and steam treatment alone is carried out as the finishing treatment in the step (β).

[Use of Mineral Base Oil]

The mineral base oil of the present invention satisfies the above-mentioned requirements and is therefore excellent in safety and environmental aspects, and has good compatibility with resin. Consequently, it is suitable for a resin-processing process oil.

Namely, in use thereof, the mineral base oil of one embodiment of the present invention is favorably mixed with one or more resins selected from a rubber resin and a thermoplastic elastomer.

Examples of the rubber resin to be mixed with the mineral base oil of one embodiment of the present invention include chloroprene rubber (CR), isoprene rubber (IR), butyl rubber (IIR), nitrile-butadiene rubber (NBR), natural rubber, styrene-butadiene copolymer rubber (SBR), butadiene rubber (BR), urethane rubber, fluororubber, amyl rubber, ethylene-propylene copolymer rubber, ethylene-propylene-diene copolymer rubber, and silicone rubber.

Examples of the thermoplastic elastomer include polyurethane thermoplastic elastomer, polyester thermoplastic elastomer, polyolefin thermoplastic elastomer, polystyrene thermoplastic elastomer, polyvinyl chloride thermoplastic elastomer, and polyamide thermoplastic elastomer.

The invention also provides a molded article formed of a resin composition containing a mineral base oil satisfying the above-mentioned requirements, and one or more resins selected from a rubber resin and a thermoplastic elastomer.

The resin composition that is a forming material for the molded article of the present invention may contain additives along with a resin and a mineral base oil.

Examples of such resins include an antioxidant, a UV absorbent, a lubricant, a flame retardant, an antistatic agent, a filler, and a foaming agent.

In one embodiment of the present invention, the content of the mineral base oil of the present invention contained in the resin composition is, based on the total amount (100% by mass) of the active components in the resin composition, preferably 0.01 to 10% by mass, more preferably 0.03 to 7% by mass, even more preferably 0.05 to 5% by mass.

Also in one embodiment of the present invention, the content of the resin in the resin composition is, based on the total amount (100% by mass) of the active components in the resin composition, preferably 50% by mass or more, more preferably 65% by mass or more, even more preferably 75% by mass or more.

The molding method for producing the molded article of the present invention is not specifically limited, and examples thereof include extrusion molding, injection molding, blow molding and calendering.

Embodiments of the present invention have been described above, but the embodiments are merely some examples of the present invention. The present invention encompasses all embodiments included in the concept and the claims of the present invention, and can be variously modified within the scope of the present invention.

EXAMPLES

Next, the present invention is described in more detail with reference to Examples, but the present invention is not whatsoever restricted by these Examples. Measurement methods and evaluation methods for various physical properties are as described below.

(1) Kinematic Viscosity at 40° C. and 100° C., Viscosity Index
  Measured and calculated according to JIS K2283:2000.
(2) Flash Point
  Measured by a Cleveland open-cup method (COC method) according to JIS K2265-4:2007.
(3) Pour Point
  Measured according to JIS K2269:1987.
(4) Aromatic Content (% $C_A$), Naphthene Content (% $C_N$), Paraffin Content (% $C_P$)
  Measured according to the ASTM D-3238 1995 ring analysis (n-d-M method).
(5) Toluene Content
  Measured according to JIS A1965:2015.
(6) Sulfur Atom Content
  Measured according to JIS K2541-6:2003.
(7) Aniline Point
  Measured according to JIS K2256:2013 (U-shaped tube method).

Production Example 1 (Preparation of Deasphalted Oil (a))

A crude oil from the Middle East was distilled under normal pressure to fractionate a fuel oil fraction of kerosene and gas oil, thereby giving a topped crude remaining at the bottom of the distillation column.
The topped crude was subjected to vacuum distillation to fractionate a vacuum distillate, thereby giving a vacuum residue remaining at the bottom of the distillation column.
Here, the vacuum residue was solvent-deasphalted using propane as a solvent to give a deasphalted oil (a). The sulfur atom content in the deasphalted oil (a) was 2.5% by mass.

Production Example 2 (Preparation of Mixed Oil (b))

50% by volume of the vacuum distillate fractionated in vacuum distillation in Production Example 1 and 50% by volume of the deasphalted oil (a) were mixed to prepare a mixed oil (b). The sulfur atom content in the mixed oil (b) was 2.6% by volume.

Example 1

A mineral base oil (i) was prepared by using the mixed oil (B) as a feedstock, through the following steps (1) to (3) in this order.
Step (1): Hydroreforming
  Using a nickel/tungsten-alumina catalyst (catalyst of nickel and tungsten held on alumina as a carrier), the mixed oil (b) as a supply oil was hydroreformed at a reaction temperature of 384° C., under a hydrogen partial pressure of 20 MPa, at a supply ratio of hydrogen to supply oil [hydrogen/supply oil] of 1000 $Nm^3/kL$ and at LHSV of 1.0 $hr^{-1}$.
  After the hydroreforming, the hydroreformed oil was distilled under reduced pressure and fractionated into three different fractions with respect to each viscosity fraction, thereby giving a fraction (b1) having a 40° C. kinematic viscosity of 28 to 34 $mm^2/s$, a fraction (b2) having a 40° C. kinematic viscosity of 70 to 110 $mm^2/s$, and a fraction (b3) having a 40° C. kinematic viscosity of 400 to 470 $mm^2/s$.
Step (2): Solvent Dewaxing
  A mixed solvent of methyl ethyl ketone/toluene=48/52 (ratio by mass) was added to the fraction (b1) obtained in the previous step (1) and cooled, and the precipitated wax was removed to give a solvent-dewaxed oil.
Step (3): Steam Treatment
  The solvent-dewaxed oil obtained in the step (3) was subjected to steam stripping, in which X: degasification tank inlet temperature (COT), and Y: ratio of steam flow rate (STM) to feed flow rate (FEED) [STM/FEED] were controlled as in Table 1, thereby giving a mineral base oil (i).

Examples 2 to 6

Mineral base oils (ii) to (vi) were respectively prepared by using the mixed oil (b) as a feedstock oil, through steps (1) to (3) in this order.
Step (1): Hydroreforming
  Under the same conditions as in Example 1, the mixed oil (b) was hydroreformed.
  After the hydroreforming, the hydroreformed oil was distilled under reduced pressure and fractionated into three different fractions with respect to each viscosity fraction in the same manner as in Example 1, thereby giving a fraction (b2) having a 40° C. kinematic viscosity of 70 to 110 $mm^2/s$.
Step (2): Solvent Dewaxing
  A mixed solvent of methyl ethyl ketone/toluene=48/52 (ratio by mass) was added to the fraction (b2) obtained in the previous step (1) and cooled, and the precipitated wax was removed to give a solvent-dewaxed oil.
Step (3): Steam Treatment
  The solvent-dewaxed oil obtained in the step (2) was subjected to steam stripping, in which X: degasification tank inlet temperature (COT), and Y: ratio of steam flow rate (STM) to feed flow rate (FEED) [STM/FEED] were controlled as in Table 1, thereby giving mineral base oils (ii) to (vi).

Examples 7 to 11

Mineral base oils (vii) to (xi) were respectively prepared by using the mixed oil (b) as a feedstock oil, through steps (1) to (3) in this order.
Step (1): Hydroreforming
  Under the same conditions as in Example 1, the mixed oil (b) was hydroreformed.
  After the hydroreforming, the hydroreformed oil was distilled under reduced pressure and fractionated into three different fractions with respect to each viscosity fraction in the same manner as in Example 1, thereby giving a fraction (b3) having a 40° C. kinematic viscosity of 400 to 470 $mm^2/s$.
Step (2): Solvent Dewaxing
  A mixed solvent of methyl ethyl ketone/toluene=48/52 (ratio by mass) was added to the fraction (b3) obtained in the previous step (1) and cooled, and the precipitated wax was removed to give a solvent-dewaxed oil.
Step (3): Steam Treatment
  The solvent-dewaxed oil obtained in the step (2) was subjected to steam stripping, in which X: degasification tank inlet temperature (COT), and Y: ratio of steam flow rate (STM) to feed flow rate (FEED) [STM/FEED] were controlled as in Tables 1 and 2, thereby giving mineral base oils (vii) to (xi).

Example 12

A mineral base oil (xii) was prepared by using the mineral base oil (ii) prepared by using the mix oil (b) as a feedstock oil through steps (1) to (3) in Example 2, and the mineral base oil (vii) prepared by using the mix oil (b) as a feedstock oil through steps (1) to (3) in Example 7, through the following step (4).

Step (4): Base Oil Mixing

The two oils were mixed in a ratio of mineral base oil (ii)/mineral base oil (vii)=65/35 (by mass) to give a mineral base oil (xii).

Example 13

A mineral base oil (xiii) was prepared in the same manner as in Example 12 except that in the step (4) in Example 12, the two oils were mixed in a ratio of mineral base oil (ii)/mineral base oil (vii)=5/95 (by mass).

Example 14

A mineral base oil (xiv) was prepared by using deasphalted oil (a) as a feedstock oil, through the following steps (1) to (4) in this order.

Step (1): Solvent Extraction

Using a furfural solvent, the deasphalted oil (a) was extracted, and the resultant extract was degasified and stripped to give a solvent-extracted oil.

Step (2): Solvent Dewaxing

A mixed solvent of methyl ethyl ketone/toluene=48/52 (ratio by mass) was added to the solvent-extracted oil obtained in the previous step (1) and cooled, and the precipitated wax was removed to give a solvent-dewaxed oil.

Step (3): Hydrofinishing (1)

Using a cobalt/molybdenum-alumina catalyst (catalyst of cobalt and molybdenum held on alumina as a carrier), the solvent-dewaxed oil as a supply oil obtained in the previous step (2) was hydrofinished at a reaction temperature controlled to fall within a range of 260 to 430° C. and under a hydrogen partial pressure of 3.9 to 5.5 MPa to give a hydrofinished oil.

Step (4): Steam Treatment

The hydrofinished oil obtained in the step (3) was subjected to steam stripping, in which X: degasification tank inlet temperature (COT), and Y: ratio of steam flow rate (STM) to feed flow rate (supply amount of oil to be subjected) (FEED) [STM/FEED] were controlled as in Table 2, thereby giving a mineral base oil (xiv).

Example 15

A mineral base oil (xv) was prepared by using deasphalted oil (a) as a feedstock oil, through the same steps (2) to (4) as in Example 14, except that the step (1) alone was changed as follows.

Step (1): Degasification

The deasphalted oil (a) was subjected to degasification and stripping to give a refined oil, without being extracted using a furfural solvent.

Comparative Example 1

A mineral base oil (1) was prepared by using the same feedstock oil through the same steps as in Example 1 except that X: degasification tank inlet temperature (COT), and Y: ratio of steam flow rate (STM) to feed flow rate (FEED) [STM/FEED] in the steam treatment in the step (3) in Example 1 were changed as in Table 3.

Comparative Example 2

A mineral base oil (2) was prepared by subjecting the mineral base oil (1) obtained in Comparative Example 1 to the following step (4).

Step (4) Hydrofinishing (2)

Using a nickel/tungsten-alumina catalyst (catalyst of nickel and tungsten held on alumina as a carrier), the mineral base oil (1) as a supply oil was hydrofinished at a reaction temperature controlled to be lower than that for hydroreforming in Example 1 so that the UV absorbent of the hydrofinished oil to be obtained could be 1.7 or less, and under a hydrogen partial pressure of 20 MPa, at a supply ratio of hydrogen to supply oil [hydrogen/supply oil] of 1000 $Nm^3/kL$, and at LHSV of 0.5 $hr^{-1}$.

After the hydrofinishing, the hydrofinished oil was distilled under reduced pressure to fractionate a fraction having a 40° C. kinematic viscosity of around 31 $mm^2/s$ or so to give a mineral base oil (2).

Comparative Example 3

A mineral base oil (3) was prepared by using the same feedstock oil through the same steps as in Example 2, except that X: degasification tank inlet temperature (COT), and Y: ratio of steam flow rate (STM) to feed flow rate (FEED) [STM/FEED] in the steam treatment in the step (3) in Example 2 were changed as in Table 3.

Comparative Example 4

A mineral base oil (4) was prepared by subjecting the mineral base oil (3) obtained in Comparative Example 3 to the following step (4).

Step (4) Hydrofinishing (2)

The mineral base oil (3) as a supply oil was hydrofinished under the same condition as in "Hydrofinishing (2)" of the Step (4) in Comparative Example 2.

After the hydrofinishing, the hydrofinished oil was distilled under reduced pressure to fractionate a fraction having a 40° C. kinematic viscosity of around 90 $mm^2/s$ or so to give a mineral base oil (4).

Comparative Example 5

A mineral base oil (5) was prepared by using the mixed oil (b) as a feedstock oil through the following steps (1) and (2) in this order.

Step (1): Hydroreforming

Under the same condition as in Example 1, the mixed oil (b) was hydroreformed.

After the hydroreforming, the hydroreformed oil was distilled under reduced pressure, and fractionated into three different fractions with respect to each viscosity fraction to give a fraction (b2) having a 40° C. kinematic viscosity of 70 to 110 $mm^2/s$.

Step (2): Hydroisomerization Dewaxing

Using a platinum-zeolite catalyst (catalyst of platinum held on zeolite as a carrier), the fraction (b2) obtained in the previous step (1) was subjected to hydroisomerization dewaxing treatment at a reaction temperature of 330° C., under a hydrogen partial pressure of 4 MPa, at a supply ratio of hydrogen to the fraction (b2) [hydrogen/fraction (b2)] of 422 $Nm^3/kL$ and at LHSV of 1.1 $hr^{-1}$ to give a mineral base oil (5).

Comparative Example 6

A mineral base oil (6) was prepared by using the same feedstock oil through the same steps as in Example 7 except that X: degasification tank inlet temperature (COT), and Y: ratio of steam flow rate (STM) to feed flow rate (FEED) [STM/FEED] in the steam treatment in the step (3) in Example 7 were changed as in Table 3.

Comparative Example 7

A mineral base oil (7) was prepare by subjecting the mineral base oil (6) obtained in Comparative Example 6 to the following step (4).
Step (4) Hydrofinishing (2)
The mineral base oil (6) as a supply oil was hydrofinished under the same condition as in "Hydrofinishing (2)" of the Step (4) in Comparative Example 2.
After the hydrofinishing, the hydrofinished oil was distilled under reduced pressure to fractionate a fraction having a 40° C. kinematic viscosity of around 410 mm²/s or so to give a mineral base oil (7).

Comparative Example 8

A mineral base oil (8) was prepare by using the mineral base oil (3) prepared by using the mixed base oil (b) as a feedstock oil through the steps (1) to (3) in Comparative Example 3 and the mineral base oil (6) prepared by using the mixed base oil (b) as a feedstock oil through the steps (1) to (3) in Comparative Example 6, through the following step (4).
Step (4): Base Oil Mixing
The two oils were mixed in a ratio of mineral base oil (3)/mineral base oil (6)=65/35 (by mass) to give a mineral base oil (8).

Comparative Example 9

A mineral base oil (9) was prepared in the same manner as in Comparative Example 8 except that, in the step (4) in Comparative Example 8, the two oils were mixed in a ratio of mineral base oil (3)/mineral base oil (6)=5/95 (by mass).

Comparative Example 10

A mineral base oil (10) was prepared by using the mineral base oil (4) prepared by using the mixed base oil (b) as a feedstock oil through the steps (1) to (4) in Comparative Example 4 and the mineral base oil (7) prepared by using the mixed base oil (b) as a feedstock oil through the steps (1) to (4) in Comparative Example 7, through the following step (5).
Step (5): Base Oil Mixing
The two oils were mixed in a ratio of mineral base oil (4)/mineral base oil (7)=65/35 (by mass) to give a mineral base oil (10).

Comparative Example 11

A mineral base oil (11) was prepared by using the same feedstock oil through the same steps as in Example 1 except that X: degasification tank inlet temperature (COT), and Y: ratio of steam flow rate (STM) to feed flow rate (FEED) [STM/FEED] in the steam treatment in the step (4) in Example 14 were changed as in Table 4.

Comparative Example 12

A mineral base oil (12) was prepared by using the same feedstock oil through the same steps as in Example 2 except that X: degasification tank inlet temperature (COT), and Y: ratio of steam flow rate (STM) to feed flow rate (FEED) [STM/FEED] in the steam treatment in the step (4) in Example 15 were changed as in Table 4.

The mineral base oils prepared in Examples and Comparative Examples were analyzed to measure the physical properties thereof according to the above-mentioned methods. The results are shown in Tables 1 to 4.

TABLE 1

| | | | Example 1 | Example 2 | Example 3 | Example 4 | Example 5 | Example 6 | Example 7 | Example 8 |
|---|---|---|---|---|---|---|---|---|---|---|
| Kind of Feedstock Oil | | | mixed oil (b) | mixed oil (b) | mixed oil (b) | mixed oil (b) | mixed oil (b) | mixed oil (b) | mixed oil (b) | mixed oil (b) |
| Order of Step | Step (1) | | Hydro-reforming | Hydro-reforming | Hydro-reforming | Hydro-reforming | Hydro-reforming | Hydro-reforming | Hydro-reforming | Hydro-reforming |
| | Step (2) | | solvent dewaxing of fraction (b1) | solvent dewaxing of fraction (b2) | solvent dewaxing of fraction (b2) | solvent dewaxing of fraction (b2) | solvent dewaxing of fraction (b2) | solvent dewaxing of fraction (b2) | solvent dewaxing of fraction (b3) | solvent dewaxing of fraction (b3) |
| | Step (3) | | steam treatment | steam treatment | steam treatment | steam treatment | steam treatment | steam treatment | steam treatment | steam treatment |
| | Step (4) | | — | — | — | — | — | — | — | — |
| Conditions for Steam Treatment | X:COT | ° C. | 205 | 205 | 215 | 225 | 205 | 225 | 205 | 215 |
| | Y:STM/FEED | — | 0.0624 | 0.0624 | 0.0624 | 0.0624 | 0.0720 | 0.0720 | 0.0624 | 0.0624 |
| | 240 − 640 − Y | — | 200.1 | 200.1 | 200.1 | 200.1 | 193.9 | 193.9 | 200.1 | 200.1 |
| | P = (240 − X)/Y | — | 560.9 | 560.9 | 400.6 | 240.4 | 486.1 | 208.3 | 560.9 | 400.6 |
| Mineral Base Oil | | | (i) | (ii) | (iii) | (iv) | (v) | (vi) | (vii) | (viii) |
| 40° C. Kinematic Viscosity | | mm²/s | 30.80 | 89.4 | 91.2 | 94.11 | 93.23 | 93.08 | 436.6 | 428.6 |
| 100° C. Kinematic Viscosity | | mm²/s | 5.267 | 10.81 | 10.90 | 11.10 | 11.03 | 11.01 | 31.77 | 31.36 |
| Viscosity Index | | | 102 | 105 | 104 | 103 | 103 | 103 | 105 | 105 |
| Flash Point | | ° C. | 214 | 264 | 270 | 266 | 268 | 264 | 324 | 326 |
| Pour Point | | ° C. | −15.0 | −15.0 | −12.5 | −15.0 | −15.0 | −12.5 | 12.5 | −12.5 |
| Ring Analysis | % $C_A$ | — | 4.2 | 3.6 | 3.4 | 3.3 | 3.4 | 3.5 | 4.2 | 4.1 |
| | % $C_N$ | — | 31.0 | 26.6 | 26.9 | 27.3 | 26.8 | 27.1 | 24.8 | 24.6 |
| | % $C_P$ | — | 64.8 | 69.8 | 69.7 | 69.4 | 69.8 | 69.4 | 71.0 | 71.3 |
| Toluene Content | | µg/m³ | 198 | 230 | 150 | 44 | 87 | 4.8 | 300 | 175 |
| Sulfur Atom Content | | mass ppm | 0 | 0 | 100 | 100 | 100 | 100 | 100 | 200 |
| Aniline Point | | ° C. | 103.0 | 119.1 | 119.3 | 119.5 | 119.0 | 118.6 | 136.0 | 135.1 |

TABLE 2

|  |  |  | Example 9 | Example 10 | Example 11 | Example 12 | |
|---|---|---|---|---|---|---|---|
| Kind of Feedstock Oil |  |  | mixed oil (b) | mixed oil (b) | mixed oil (b) | mixed oil (b) | mixed oil (b) |
| Order of Step | Step (1) |  | Hydro-reforming | Hydro-reforming | Hydro-reforming | same as in Example 2 | same as in Example 7 |
|  | Step (2) |  | solvent dewaxing of fraction (b3) | solvent dewaxing of fraction (b3) | solvent dewaxing of fraction (b3) |  |  |
|  | Step (3) |  | steam treatment | steam treatment | steam treatment |  |  |
|  | Step (4) |  | — | — | — | mixing of base oils ((ii)/(vii) = 65/35) |  |
| Conditions for Steam Treatment | X:COT | °C. | 225 | 205 | 225 | 205 | 205 |
|  | Y:STM/FEED | — | 0.0624 | 0.0720 | 0.0720 | 0.0624 | 0.0624 |
|  | 240 − 640 − Y | — | 200.1 | 193.9 | 193.9 | 200.1 | 200.1 |
|  | P = (240 − X)/Y | — | 240.4 | 486.1 | 208.3 | 560.9 | 560.9 |
| Mineral Base Oil |  |  | (ix) | (x) | (xi) | (xii) |  |
| 40° C. Kinematic Viscosity |  | mm²/s | 423.1 | 439.3 | 443.2 | 147.1 |  |
| 100° C. Kinematic Viscosity |  | mm²/s | 31.16 | 31.88 | 32.22 | 15.14 |  |
| Viscosity Index |  |  | 105 | 105 | 106 | 105 |  |
| Flash Point |  | °C. | 314 | 316 | 314 | 282 |  |
| Pour Point |  | °C. | −12.5 | −12.5 | −12.5 | −12.5 |  |
| Ring Analysis | % $C_A$ |  | 3.9 | 3.8 | 3.7 | 2.6 |  |
|  | % $C_N$ |  | 24.9 | 24.7 | 24.6 | 26.9 |  |
|  | % $C_P$ |  | 71.2 | 71.5 | 71.6 | 70.5 |  |
| Toluene Content |  | μg/m³ | 58 | 64 | 6.8 | 248 |  |
| Sulfur Atom Content |  | mass ppm | 100 | 100 | 100 | 0 |  |
| Aniline Point |  | °C. | 137.1 | 137.5 | 137.4 | 125.0 |  |

|  |  |  | Example 13 | Example 14 | Example 15 |
|---|---|---|---|---|---|
| Kind of Feedstock Oil |  |  | mixed oil (b) | deasphalted oil (a) | deasphalted oil (a) |
| Order of Step | Step (1) |  | same as in Example 2 same as in Example 7 | solvent extraction | degasification |
|  | Step (2) |  |  | solvent dewaxing | solvent dewaxing |
|  | Step (3) |  |  | hydrofinishing (1) | hydrofinishing (1) |
|  | Step (4) |  | mixing of base oils ((ii)/(vii) = 5/95) | steam treatment | steam treatment |
| Conditions for Steam Treatment | X:COT | °C. | 205 205 | 205 | 205 |
|  | Y:STM/FEED | — | 0.0624 0.0624 | 0.0624 | 0.0624 |
|  | 240 − 640 − Y | — | 200.1 200.1 | 200.1 | 200.1 |
|  | P = (240 − X)/Y | — | 560.9 560.9 | 560.9 | 560.9 |
| Mineral Base Oil |  |  | (xiii) | (xiv) | (xv) |
| 40° C. Kinematic Viscosity |  | mm²/s | 411.0 | 161.5 | 483.5 |
| 100° C. Kinematic Viscosity |  | mm²/s | 29.82 | 15.24 | 32.34 |
| Viscosity Index |  |  | 105 | 95 | 98 |
| Flash Point |  | °C. | 321 | 284 | 318 |
| Pour Point |  | °C. | −12.5 | −15.0 | −12.5 |
| Ring Analysis | % $C_A$ |  | 3.0 | 7.6 | 7.0 |
|  | % $C_N$ |  | 25.0 | 24.0 | 25.8 |
|  | % $C_P$ |  | 72.0 | 68.4 | 67.2 |
| Toluene Content |  | μg/m³ | 281 | 263 | 412 |
| Sulfur Atom Content |  | mass ppm | 100 | 8300 | 11600 |
| Aniline Point |  | °C. | 135.5 | 111.2 | 122.5 |

TABLE 3

|  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Kind of Feedstock Oil |  | mixed oil (b) | mixed oil (b) | mixed oil (b) | mixed oil (b) | mixed oil (b) | mixed oil (b) | mixed oil (b) |
| Order of Step | Step (1) | Hydro-reforming | Hydro-reforming | Hydro-reforming | Hydro-reforming | Hydro-reforming | Hydro-reforming | Hydro-reforming |
|  | Step (2) | solvent dewaxing of fraction (b1) | solvent dewaxing of fraction (b1) | solvent dewaxing of fraction (b2) | solvent dewaxing of fraction (b2) | hydro-isomerization dewaxing | solvent dewaxing of fraction (b3) | solvent dewaxing of fraction (b3) |

TABLE 3-continued

| | | | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|
| | Step (3) | | steam treatment | steam treatment | steam treatment | steam treatment | — | steam treatment | steam treatment |
| | Step (4) | | — | hydrofinishing (2) | — | hydrofinishing (2) | — | — | hydrofinishing (2) |
| | Step (5) | | — | — | — | — | — | — | — |
| Conditions for Steam Treatment | X:COT | °C. | 205 | 205 | 205 | 205 | — | 205 | 205 |
| | Y:STM/FEED | — | 0.0264 | 0.0264 | 0.0264 | 0.0264 | — | 0.0264 | 0.0264 |
| | 240 − 640 · Y | — | 223.1 | 223.1 | 223.1 | 223.1 | — | 223.1 | 223.1 |
| | P = (240 − X)/Y | — | 1325.8 | 1325.8 | 1325.8 | 1325.8 | — | 1325.8 | 1325.8 |
| Mineral Base Oil | | | (1) | (2) | (3) | (4) | (5) | (6) | (7) |
| 40° C. Kinematic Viscosity | | mm²/s | 30.66 | 30.60 | 90.48 | 90.51 | 92.95 | 435.1 | 408.8 |
| 100° C. Kinematic Viscosity | | mm²/s | 5.281 | 5.29 | 10.85 | 10.89 | 10.87 | 32.22 | 30.86 |
| Viscosity Index | | — | 104 | 104 | 104 | 107 | 101 | 107 | 107 |
| Flash Point | | °C. | 222 | 222 | 260 | 266 | 250 | 324 | 300 |
| Pour Point | | °C. | −15.0 | −15.0 | −15.0 | 15.0 | −17.5 | −12.5 | −12.5 |
| Ring Analysis | % $C_A$ | — | 5.2 | 0.0 | 3.4 | 0.0 | 2.3 | 4.0 | 0.0 |
| | % $C_N$ | — | 29.2 | 32.9 | 30.4 | 28.0 | 27.7 | 24.7 | 27.0 |
| | % $C_P$ | — | 65.6 | 67.1 | 27.0 | 72.0 | 70.0 | 71.3 | 73.0 |
| Toluene Content | | μg/m³ | 720 | 14 | 1120 | 14 | 3> | 1630 | 15 |
| Sulfur Atom Content | | mass ppm | 100 | 0 | 100 | 0 | 100 | 200 | 2 |
| Aniline Point | | °C. | 104.0 | 108.6 | 117.1 | 124.8 | 120.0 | 138.0 | 142.7 |

TABLE 4

| | | | Comparative Example 8 | | Comparative Example 9 | | Comparative Example 10 | |
|---|---|---|---|---|---|---|---|---|
| Kind of Feedstock Oil | | | mixed oil (b) | mixed oil (b) | mixed oil (b) | mixed oil (b) | mixed oil (b) | mixed oil (b) |
| Order of Step | Step (1) Step (2) Step (3) | | same as in Comparative Example 3 | same as in Comparative Example 6 | same as in Comparative Example 3 | same as in Comparative Example 6 | same as in Comparative Example 4 | same as in Comparative Example 7 |
| | Step (4) | | mixing of base oils ((3)/(6) = 65/35) | | mixing of base oils ((3)/(6) = 5/95) | | | |
| | Step (5) | | — | | — | | mixing of base oils ((4)/(7) = 65/35) | |
| Conditions for Steam Treatment | X:COT | °C. | 205 | 205 | 205 | 205 | 205 | 205 |
| | Y:STM/FEED | — | 0.0264 | 0.0264 | 0.0264 | 0.0264 | 0.0264 | 0.0264 |
| | 240 − 640 · Y | — | 223.1 | 223.1 | 223.1 | 223.1 | 223.1 | 223.1 |
| | P = (240 − X)/Y | — | 1325.8 | 1325.8 | 1325.8 | 1325.8 | 1325.8 | 1325.8 |
| Mineral Base Oil | | | (8) | | (9) | | (10) | |
| 40° C. Kinematic Viscosity | | mm²/s | 154.9 | | 381.4 | | 145.3 | |
| 100° C. Kinematic Viscosity | | mm²/s | 15.7 | | 28.46 | | 15.12 | |
| Viscosity Index | | — | 104 | | 109 | | 105 | |
| Flash Point | | °C. | 278 | | 328 | | 270 | |
| Pour Point | | °C. | −12.5 | | −12.5 | | −12.5 | |
| Ring Analysis | % $C_A$ | — | 2.6 | | 3.0 | | −2.0 | |
| | % $C_N$ | — | 26.9 | | 25.0 | | 31.3 | |
| | % $C_P$ | — | 70.5 | | 72.0 | | 70.7 | |
| Toluene Content | | μg/m³ | 1240 | | 1400 | | 13 | |
| Sulfur Atom Content | | mass ppm | 36 | | 100 | | 12 | |
| Aniline Point | | °C. | 125.9 | | 135.9 | | 131.0 | |

| | | | Comparative Example 11 | Comparative Example 12 |
|---|---|---|---|---|
| Kind of Feedstock Oil | | | deasphalted oil (a) | deasphalted oil (a) |
| Order of Step | Step (1) | | solvent extraction | degasification |
| | Step (2) | | solvent dewaxing | solvent dewaxing |
| | Step (3) | | hydrofinishing (1) | hydrofinishing (1) |
| | Step (4) | | steam treatment | steam treatment |
| | Step (5) | | — | — |
| Conditions for Steam | X:COT | °C. | 205 | 205 |
| | Y:STM/FEED | — | 0.0264 | 0.0264 |

TABLE 4-continued

| Treatment | 240 − 640 − Y | — | 223.1 | 223.1 |
|---|---|---|---|---|
|  | P = (240 − X)/Y | — | 1325.8 | 1325.8 |
| Mineral Base Oil |  |  | (11) | (12) |
| 40° C. Kinematic Viscosity |  | mm²/s | 160.6 | 160.6 |
| 100° C. Kinematic Viscosity |  | mm²/s | 15.19 | 31.57 |
| Viscosity Index |  |  | 95 | 95 |
| Flash Point |  | ° C. | 280 | 324 |
| Pour Point |  | ° C. | −15.0 | −12.5 |
| Ring | % $C_A$ | — | 7.5 | 6.8 |
| Analysis | % $C_N$ | — | 24.2 | 24.6 |
|  | % $C_P$ | — | 68.3 | 68.5 |
| Toluene Content |  | μg/m³ | 840 | 1080 |
| Sulfur Atom Content |  | mass ppm | 8300 | 10100 |
| Aniline Point |  | ° C. | 111.2 | 121.6 |

The mineral base oils (i) to (xv) obtained in Examples 1 to 15 have a high aromatic content (% $C_A$), and are therefore considered to have good compatibility with resin. In addition, the mineral base oils (i) to (xv) have a reduced toluene content, and therefore can be said to be excellent in safety and environmental aspects.

On the other hand, the mineral base oils (1) to (12) obtained in Comparative Examples 1 to 12 have a low aromatic content (% $C_A$) and are therefore problematic in compatibility with resin, or have a high toluene content and are therefore problematic in safety and environmental aspects.

The invention claimed is:

1. A mineral base oil, satisfying requirements (I) to (IV):
   (I): a flash point is 200° C. or higher;
   (II): a pour point is 0° C. or lower;
   (III): an aromatic content (% $C_A$) obtained according to ASTM D-3238 1995 ring analysis is 2.6 to 4.2; and
   (IV): toluene content, as measured according to JIS A-1965:2015, is more than 0 μg/m³ and less than 500 μg/m³.

2. The mineral base oil of claim 1, wherein the toluene content of (IV) is 3.0 μg/m³ or more and less than 500 μg/m³.

3. The mineral base oil of claim 1, further satisfying the following requirement (V):
   (V): a sulfur atom content is, based on a total amount of the mineral base oil, less than 500 ppm by mass.

4. A rubber resin or a thermoplastic elastomer, comprising the mineral base oil of claim 1.

5. A molded article, formed of a resin composition comprising the mineral base oil of claim 1 and one or more resins selected from the group consisting of a rubber resin and a thermoplastic elastomer.

6. A method for producing the mineral base oil of claim 1, the method comprising:
   (α): solvent-dewaxing a feedstock oil, using a solvent comprising toluene, to obtain a solvent-dewaxed oil.

7. The method of claim 6, further comprising, after (α):
   (β): subjecting the solvent-dewaxed oil obtained in (α) to a finishing treatment comprising at least a steam treatment.

8. The method of claim 7, wherein the steam treatment of (β) satisfies the following requirements (i) to (iii), wherein X represents a degasification tank inlet temperature (COT) (°C.), and Y represents a ratio of a steam flow rate (STM) to a feed flow rate (FEED) [STM/FEED]:
   (i): X≥200,
   (ii): Y≥0.0300, and
   (iii): 240-640×Y<X.

9. A method of producing a composition, the method comprising mixing the mineral base oil of claim 1 with one or more resins selected from the group consisting of a rubber resin and a thermoplastic elastomer.

* * * * *